US 6,564,348 B1

United States Patent
Barenys et al.

(10) Patent No.: US 6,564,348 B1
(45) Date of Patent: May 13, 2003

(54) METHOD AND APPARATUS FOR STORING AND USING CHIPSET BUILT-IN SELF-TEST SIGNATURES

(75) Inventors: Michael Anton Barenys, Austin, TX (US); Joel Gerald Goodwin, Austin, TX (US); Michael Youhour Lim, Leander, TX (US); Chetan Mehta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/434,874

(22) Filed: Nov. 4, 1999

(51) Int. Cl.⁷ ............................. G01R 31/28; H02H 3/05
(52) U.S. Cl. ............................................ 714/732; 714/36
(58) Field of Search ................................. 714/733, 734, 714/736, 732, 742, 819, 724, 738, 37, 47, 30, 25, 21

(56) References Cited

U.S. PATENT DOCUMENTS

| 5,557,558 A | * 9/1996 | Daito ........................ 702/120 |
| 5,638,382 A | * 6/1997 | Krick et al. ................ 714/733 |
| 5,668,947 A | * 9/1997 | Batcher ....................... 714/30 |
| 6,104,304 A | * 8/2000 | Clark et al. ................ 340/664 |

* cited by examiner

Primary Examiner—Christine T. Tu
(74) Attorney, Agent, or Firm—Duke W. Yee; Mark E. McBurney; Lisa L.B. Yociss

(57) ABSTRACT

A method and apparatus for storing and using chipset built-in self-test (BIST) signatures is provided. A BIST for a chip in a data processing system may be initiated by a power-on-reset in the data processing system. The BIST signature generated during the BIST is compared with a predetermined BIST signature stored in a vital products data (VPD) module associated with the chip is read. A difference between the generated BIST signature and the predetermined BIST signature is then reported.

16 Claims, 3 Drawing Sheets

METHOD AND APPARATUS FOR STORING AND USING CHIPSET BUILT-IN SELF-TEST SIGNATURES

BACKGROUND OF THE INVENTION

1. Technical Field

The present invention relates to an improved data processing system and, in particular, to a method and system for data processing system reliability, and more specifically, for digital logic testing.

2. Description of Related Art

As computers become more sophisticated, diagnostic and repair processes have become more complicated and require more time to complete. A service engineer may "chase" errors through lengthy diagnostic procedures in an attempt to locate one or more components that may be causing errors within the computer. For example, a diagnostic procedure may indicate an installed component or field replaceable unit (FRU) that is a likely candidate for the error, and the installed FRU may be replaced with a new FRU. The reported problem may be considered resolved at that point. If, after further testing of the previously installed FRU, the FRU is later determined to be reliable, the original problem has not actually been resolved and may remain unresolved until the next error is reported. In addition to paying for unnecessary components, a business must also pay for the recurring labor costs of the service engineer and lost productivity of the user of the error-prone system.

Diagnosing errors during initial program load (IPL) is especially difficult because the operating system, which may contain sophisticated error logging functions, has not yet been loaded at that stage of system initialization, and the IPL code is purposefully devoid of many diagnostic functions in order to keep the IPL code efficient. Many computer systems employ chipsets designed with built-in self-tests (BISTs). The BISTs are dedicated test circuits integrated with other circuitry on a chip. During power-on reset (POR) of the system, POR BISTs automatically start and complete within a few seconds. As a result, a bit signature, or binary data pattern, is generated by the BIST. The IPL code reads the POR BIST signatures and compares the generated BIST signatures with predetermined signatures stored in the IPL code during code compilation, i.e. hardcoded into the IPL code. In addition to the POR BIST, the IPL code may initiate logical BISTs (LBISTs) or array BISTs (ABISTs) and verify their signatures.

A problem may arise when there is a need to update one of the system chipsets with a newer version. When a new chipset is deployed, any IPL code containing associated BIST signatures must be updated to reflect the BIST signatures for the new chips. For most systems, the IPL code is stored in a flash module on the native I/O (NIO) planar. If there is a problem during the flash update of the IPL code that corrupts the IPL code, then the NIO planar must be replaced. If the chipset that needs to be upgraded or parts of the chipset that become defective are on different planars then the NIO planar is on a different planar than the NIO planar, then multiple planars may be replaced. In either case, replacement of a flash module results in increased costs and downtimes.

Therefore, it would be advantageous to provide a method and apparatus for efficiently storing BIST signatures within a data processing system other than in the IPL module.

SUMMARY OF THE INVENTION

A method and apparatus for storing and using chipset built-in self-test (BIST) signatures is provided. A BIST for a chip in a data processing system may be initiated by a power-on-reset in the data processing system. The BIST signature generated during the BIST is compared with a predetermined BIST signature stored in a vital products data (VPD) module associated with the chip is read. A difference between the generated BIST signature and the predetermined BIST signature is then reported.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
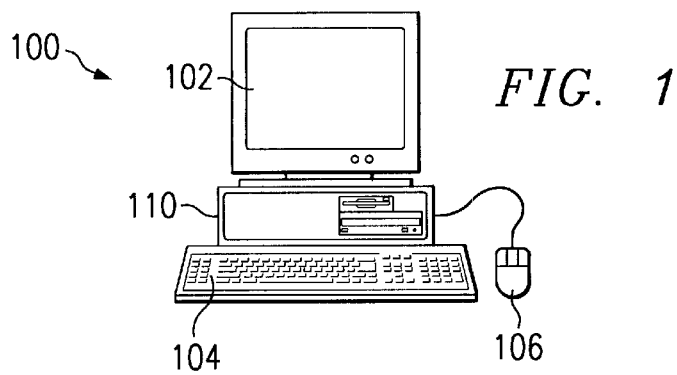
FIG. 1 is a pictorial representation depicting a data processing system in which the present invention may be implemented.

With reference now to FIG. 1, a pictorial representation depicts a data processing system in which the present invention may be implemented. A computer 100 is depicted, which includes a system unit 110, a video display terminal 102, a keyboard 104, storage devices 108, which may include floppy drives and other types of permanent and removable storage media, and mouse 106. Additional input devices may be included with computer 100. Computer 100 can be implemented using any suitable computer, for example, an IBM RISC/System 6000 system, a product of International Business Machines Corporation in Armonk, N.Y., running the Advanced Interactive Executive (AIX) operating system, also a product of IBM. Although the depicted representation shows a server-type computer, other embodiments of the present invention may be implemented in other types of data processing systems, such as workstations, network computers, Web-based television set-top boxes, Internet appliances, etc. Computer 100 also preferably includes a graphical user interface that may be implemented by means of system software residing in computer readable media in operation within computer 100.

FIG. 1 is intended as an example and not as an architectural limitation for the present invention.

Figure 2A:
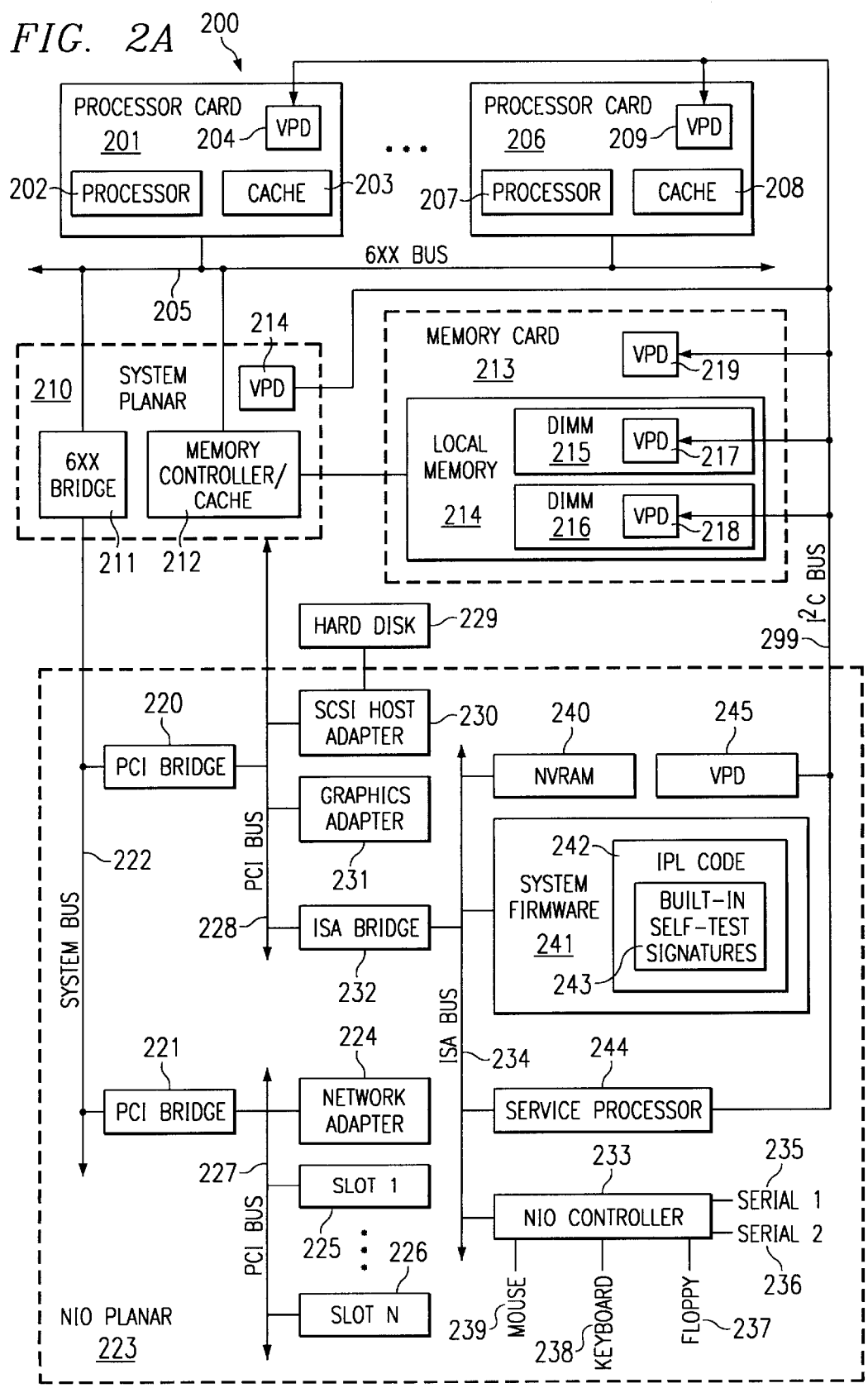
FIG. 2A is a block diagram depicting a typical organization of internal components in a data processing system.

With reference now to FIG. 2A, a block diagram depicts a typical organization of internal components in a data processing system. Data processing system 200 employs a variety of bus structures and protocols. Although the depicted example employs a PCI bus, an ISA bus, a 6XX bus, and an inter-integrated circuit ($I^2C$) bus, other bus architectures and protocols may be used. $I^2C$ is a simple two wire serial communications bus that employs an open collector to dot-and several ICs onto a bus. The 2 signals are serial clock line (SCL) and serial data line (SDL). This technology is patented by Philips Semiconductor.

Processor card 201 contains processor 202, L2 cache 203, and vital product data module (VPD) 204 that are connected to 6XX bus 205. System 200 may contain a plurality of processor cards. Processor card 206 contains processor 207, L2 cache 208, and VPD module 209.

6XX bus 205 supports system planar 210 that contains 6XX bridge 211 and memory controller/cache 212 that supports memory card 213. System planar 210 also has a unique vital product data module, VPD 214. Memory card 213 contains local memory 214 consisting of a plurality of dual in-line memory modules (DIMMs) 215 and 216. Each DIMM contains its own VPD module, such as VPDs 217 and 218. In addition, memory card 213 also has unique VPD 219.

6XX bridge 211 connects to PCI bridges 220 and 221 via system bus 222. PCI bridges 220 and 221 are contained on native I/O (NIO) planar 223 which supports a variety of I/O components and interfaces. PCI bridge 221 provides connections for external data streams through network adapter 224 and a number of card slots 225–226 via PCI bus 227. PCI bridge 220 connects a variety of I/O devices via PCI bus 228. Hard disk 229 may be connected to SCSI host adapter 230, which is connected to PCI bus 228. Graphics adapter 231 may also be connected to PCI bus 228 as depicted, either directly or indirectly.

ISA bridge 232 connects to PCI bridge 220 via PCI bus 228. ISA bridge 232 provides interconnection capabilities through NIO controller 233 via ISA bus 234, such as serial connections 235 and 236. Floppy drive connection 237 provides removable storage. Keyboard connection 238 and mouse connection 239 allow data processing system 200 to accept input data from a user. Non-volatile RAM (NVRAM) 240 provides non-volatile memory for preserving certain types of data from system disruptions or system failures, such as power supply problems. System firmware 241 is also connected to ISA bus 234 and controls the initial BIOS using initial program load (IPL) code 242 containing hard-coded built-in self-test (BIST) signatures 243. Service processor 244 is connected to ISA bus 234 and provides functionality for system diagnostics or system servicing.

Service processor 244 detects errors and passes information to the operating system. The source of the errors may or may not be known to a reasonable certainty at the time that the error is detected. The operating system may merely log the errors against the system planar.

For example, boot-time errors, severe intermittent problems, and adverse environmental computing conditions, such as conditional bandwidth bottlenecks, may be logged by the service processor into an error report buffer. These errors are eventually output and reported in some form, either to a hard drive or one of many types of backup systems. Each detected error may result in the generation of an error record comprising a timestamp at the time of detection, detailed data pertinent to the failing function, including physical location code, symptom bits, etc. Further analysis may be done at a later time if the error logs are stored in an error log file or error log buffer containing the data that some problem determination procedures may require for analysis.

The manner of logging and processing a detected error may depend on the type of error and when the error occurs, e.g., whether the error occurs during system initialization procedures. If an error is detected during system initialization, all devices, components, or services within the data processing system may not have been initialized. For example, if an error is detected during system initialization, the service firmware may present certain errors to a system operator by writing error codes or error messages to an LCD display or system display monitor physically connected to the data processing system without being able to log error-derived data to the system log file. In other cases, the action of logging the data may start problem determination procedures in the operating system automatically. This may be accomplished by a deamon within the operating system that invokes pre-registered procedures based on the personality traits of the error logged.

NIO planar 223 also contains unique VPD module 245. Service processor 244 may read VPD modules 204, 209, 214, 217–219, and 245 via I2C bus 299. The vital product data modules contain configuration information, such as product serial numbers, location of manufacturing, engineering change (EC) level data, FRU number, and part numbers that describe associated chips, boards, parts, etc. Other VPD information may include the speed, size, or other operational parameters of associated modules. Some of the VPD information in the VPD module may be written into the VPD module in a write-protected manner by a manufacturer just prior to completion and shipping of a product. Other VPD modules may be implemented within system 200, such as a VPD module within network adapter 224.

Those of ordinary skill in the art will appreciate that the hardware in FIG. 2A may vary depending on the system implementation. For example, the system may have more processors, and other peripheral devices may be used in addition to or in place of the hardware depicted in FIG. 2A. The depicted examples are not meant to imply architectural limitations with respect to the present invention.

Figure 2B:
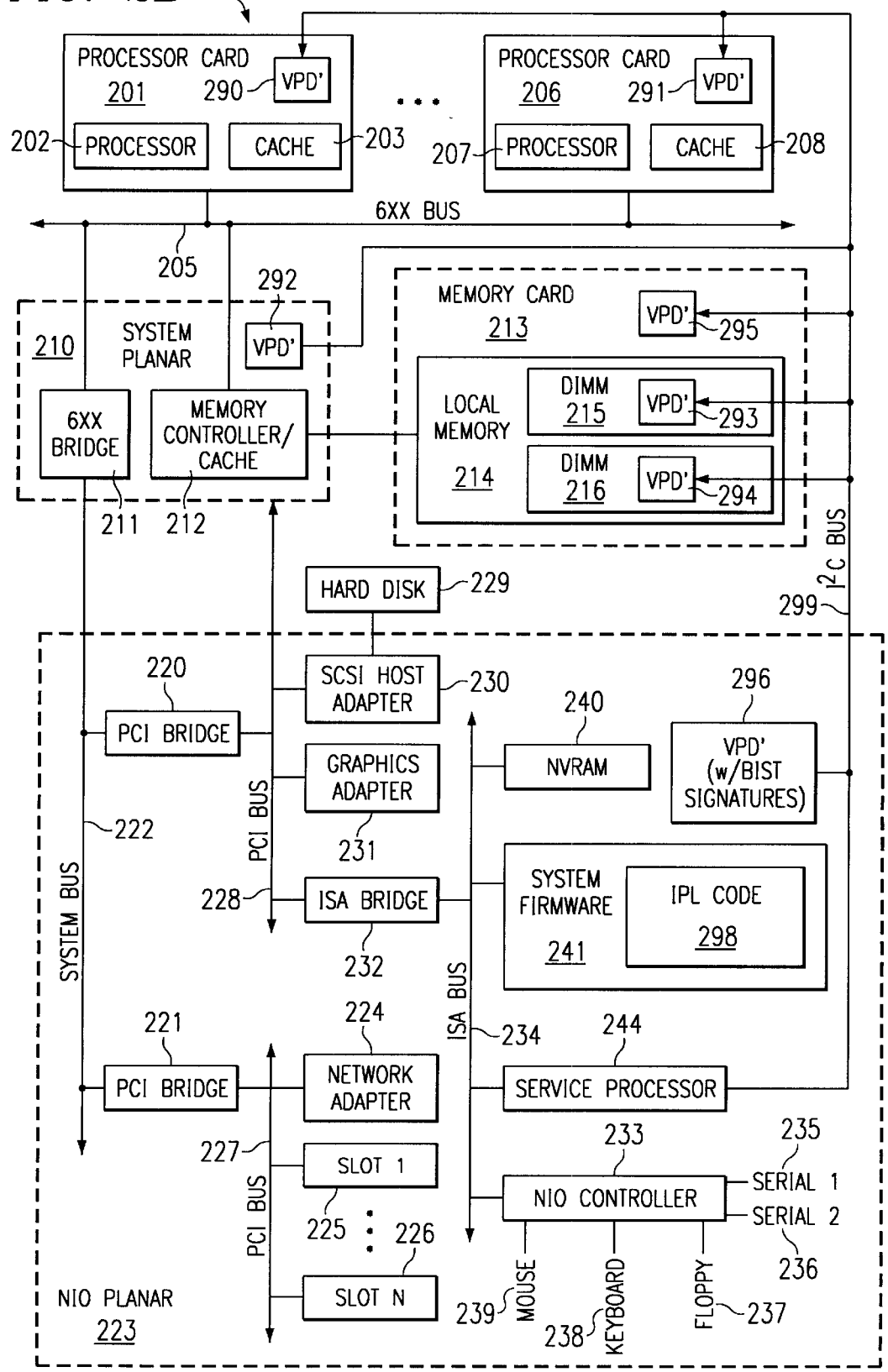
FIG. 2B is a block diagram depicting an organization of internal components in a data processing system in accordance with a preferred embodiment of the present invention.

With reference now to FIG. 2B, a block diagram depicts an organization of internal components in a data processing system in accordance with a preferred embodiment of the present invention. Similar reference numerals refer to similar components in FIG. 2A and FIG. 2B. However, VPD modules 204, 209, 214, 217–219, and 245 in FIG. 2A have been replaced in FIG. 2B with VPD' modules 290–296, and IPL code 298 in FIG. 2A has been replaced with IPL code 299 in FIG. 2B. Service processor 244 may still access VPD' modules 290–296 via $I^2C$ bus 299 in which the VPD' modules contain BIST signatures.

By storing the chipset BIST signatures, such as POS BIST, LBIST, and ABIST signatures, in the VPD' modules associated with the chipset, such as in VPD modules 290–296, the IPL code can compare the chip BIST signatures that are generated during BISTs with the correct BIST signatures stored in the VPD modules rather than relying on a hard-coded BIST signature stored in the IPL code or system firmware. When the need arises to replace a planar with a newer chipset, the VPD' modules 290–296 will be preconfigured with the new BIST signature for the new chipset. The present invention eliminates the need to modify the IPL code or perform a flash update for the new IPL code, which may corrupt the IPL code.

Figure 3:
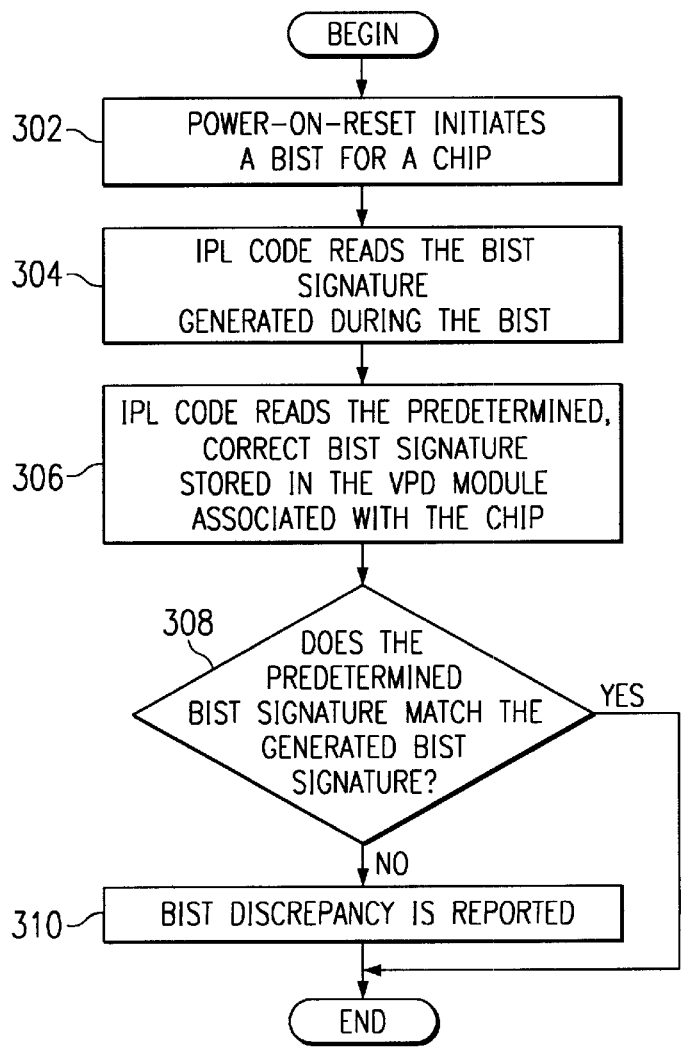
FIG. 3 is a flowchart depicting a process by which IPL code verifies BIST signatures in accordance with a preferred embodiment of the present invention.

With reference now to FIG. 3, a flowchart depicts a process by which IPL code verifies BIST signatures in accordance with a preferred embodiment of the present invention. The process begins with the power-on-reset initiating a BIST for a chip (step 302). The IPL code reads the BIST signature generated during the BIST, (step 304), and the IPL code also reads the predetermined, correct BIST signature stored in the VPD module associated with the chip (step 306). A determination is then made as to whether the generated BIST signature and the stored BIST signature are equal (step 308). If so, the IPL code continues with other boot functions. If not, then the BIST discrepancy is reported in an appropriate manner (step 310). The process is then complete with respect to initializing the chip.

The advantages provided by the present invention should be apparent in view of the detailed description of the invention provided above. By storing BIST signatures in VPD modules, the need for potentially problematic updates of IPL code is eliminated, thereby saving repair cost and system downtime.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include ROM chips or writable-type media such a floppy disc, a hard disk drive, a RAM, and CD-ROMs as well as transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for performing a built-in self-test (BIST) in a data processing system, the method comprising the computer-implemented steps of:
    initiating a BIST in a chip in the data processing system;
    reading, utilizing initial program load (IPL) code, the BIST signature generated during the BIST;
    reading, utilizing said IPL code, a predetermined BIST signature stored in a vital products data (VPD) module associated with the chip;
    comparing, utilizing said IPL code, the generated BIST signature and the predetermined BIST signature; and
    reporting a difference between the generated BIST signature and the predetermined BIST signature.

2. The method of claim 1 wherein the BIST is selected from the group consisting of a power-on reset (POR) BIST, a logical BIST (LBIST), or an array BIST (ABIST).

3. The method of claim 1 wherein the BIST is initiated by initial program (IPL) code in the data processing system.

4. The method of claim 3 wherein the IPL code is located in a flash module in the data processing system.

5. A data processing system for performing a built-in self-test (BIST) in the data processing system, the data processing system comprising:
    initiating means for initiating a BIST in a chip in the data processing system;
    first reading means for reading, utilizing initial program load (IPL) code, the BIST signature generated during the BIST;
    second reading means for reading, utilizing said IPL code, a predetermined BIST signature stored in a vital products data (VPD) module associated with the chip;
    comparing means for comparing, utilizing said IPL code, the generated BIST signature and the predetermined BIST signature; and
    reporting means for reporting a difference between the generated BIST signature and the predetermined BIST signature.

6. The data processing system of claim 5 wherein the BIST is selected from the group consisting of a power-on reset (POR) BIST, a logical BIST (LBIST), or an array BIST (ABIST).

7. The data processing system of claim 5 wherein the BIST is initiated by initial program (IPL) code in the data processing system.

8. The data processing system of claim 7 wherein the IPL code is located in a flash module in the data processing system.

9. A computer program product in a computer-readable medium for performing a built-in self-test (BIST) in a data processing system, the computer program product comprising:
    first instructions for initiating a BIST in a chip in the data processing system;
    second instructions for reading, utilizing initial program load (IPL) code, the BIST signature generated during the BIST;
    third instructions for reading, utilizing said IPL code, a predetermined BIST signature stored in a vital products data (VPD) module associated with the chip;
    fourth instructions for comparing, utilizing said IPL code, the generated BIST signature and the predetermined BIST signature; and
    fifth instructions for reporting a difference between the generated BIST signature and the predetermined BIST signature.

10. The computer program product of claim 9 wherein the BIST is selected from the group consisting of a power-on reset (POR) BIST, a logical BIST (LBIST), or an array BIST (ABIST).

11. The computer program product of claim 9 wherein the BIST is initiated by initial program (IPL) code in the data processing system.

12. The computer program product of claim 11 wherein the IPL code is located in a flash module in the data processing system.

13. A method for performing a built-in self-test (BIST) in a plurality of different chips in a data processing system, the method comprising the steps of:
    initiating a BIST in each of said plurality of different chips in said data processing system;
    reading a BIST signature generated during the BIST for each of said plurality of different chips;
    for each of said plurality of different chips, reading a predetermined BIST signature stored in a vital products data (VPD) module associated with the chip;
    determining whether each of said plurality of different chips passed its BIST by comparing the generated BIST signature and the predetermined BIST signature for each of said plurality of different chips; and
    reporting a difference between the generated BIST signature and the predetermined BIST signature for each of said plurality of different chips.

14. A system for performing a built-in self-test (BIST) in a plurality of different chips in a data processing system, said system comprising:
    means for initiating a BIST in each of said plurality of different chips in said data processing system;
    means for reading a BIST signature generated during the BIST for each of said plurality of different chips;

for each of said plurality of different chips, means for reading a predetermined BIST signature stored in a vital products data (VPD) module associated with the chip;

means for determining whether each of said plurality of different chips passed its BIST by comparing the generated BIST signature and the predetermined BIST signature for each of said plurality of different chips; and means for reporting a difference between the generated BIST signature and the predetermined BIST signature for each of said plurality of different chips.

15. A method for performing a built-in self-test (BIST) in a plurality of different chips in a data processing system, the method comprising the steps of:

providing a different vital product data (VPD) module for each of said plurality of different chips;

associating said VPD module provided for each of said plurality of different chips with each of said plurality of different chips;

storing a predetermined BIST signature associated with one of said plurality of different chips in a VPD module associated with said one of said plurality of different chips;

executing a power-on reset of said data processing system;

initiating a BIST in each of said plurality of different chips in said data processing system in response to said power-on reset;

reading, utilizing initial program load (IPL) code, a BIST signature generated during the BIST for each of said plurality of different chips;

for each of said plurality of different chips, accessing each VPD to read, utilizing said IPL code, said predetermined BIST signature stored in said (VPD) module associated with the chip;

determining, utilizing said IPL code, whether each of said plurality of different chips passed its BIST by comparing the generated BIST signature and the predetermined BIST signature for each of said plurality of different chips; and reporting a difference between the generated BIST signature and the predetermined BIST signature for each of said plurality of different chips.

16. A system for performing a built-in self-test (BIST) in a plurality of different chips in a data processing system, said system comprising:

means for providing a different vital product data (VPD) module for each of said plurality of different chips;

means for associating said VPD module provided for each of said plurality of different chips with each of said plurality of different chips;

means for storing a predetermined BIST signature associated with one of said plurality of different chips in a VPD module associated with said one of said plurality of different chips;

means for executing a power-on reset of said data processing system;

means for initiating a BIST in each of said plurality of different chips in said data processing system in response to said power-on reset;

means for reading, utilizing initial program load (IPL) code, a BIST signature generated during the BIST for each of said plurality of different chips;

for each of said plurality of different chips, means for accessing each VPD module to read, utilizing said IPL code, said predetermined BIST signature stored in said (VPD) module associated with the chip;

means for determining, utilizing said IPL code, whether each of said plurality of different chips passed its BIST by comparing the generated BIST signature and the predetermined BIST signature for each of said plurality of different chips; and means for reporting a difference between the generated BIST signature and the predetermined BIST signature for each of said plurality of different chips.

* * * * *